(12) United States Patent
Feng et al.

(10) Patent No.: US 11,298,715 B2
(45) Date of Patent: Apr. 12, 2022

(54) COATING MASK AND COATING DEVICE (71) Applicant: HON HAI PRECISION INDUSTRY CO., LTD., New Taipei (TW)

(72) Inventors: Ya-Lan Feng, New Taipei (TW); Chun-Cheng Ko, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 16/910,362

(22) Filed: Jun. 24, 2020

(65) Prior Publication Data

US 2021/0213476 A1    Jul. 15, 2021

(30) Foreign Application Priority Data

Jan. 15, 2020   (CN) .......................... 202010043608.8

(51) Int. Cl.
*B05B 12/20*      (2018.01)
*F16C 33/44*      (2006.01)
*B05C 21/00*      (2006.01)

(52) U.S. Cl.
CPC ............ *B05B 12/20* (2018.02); *B05C 21/005* (2013.01); *F16C 33/445* (2013.01)

(58) Field of Classification Search
None
See application file for complete search history.

(56) References Cited

U.S. PATENT DOCUMENTS

2013/0340676 A1* 12/2013 Pei ........................ B05C 21/005
                                                                118/500
2020/0047214 A1*  2/2020 Wei ........................ B05C 13/02
2020/0049859 A1*  2/2020 Wei ........................ G02B 1/10

FOREIGN PATENT DOCUMENTS

CN          108977764 A       12/2018
CN          209624811 U       11/2019

* cited by examiner

*Primary Examiner* — Jethro M. Pence
(74) *Attorney, Agent, or Firm* — ScienBiziP, P.C.

(57) ABSTRACT

A coating mask for bearing and covering a portion of a to-be-plated component includes at least one bearing unit. Each bearing unit includes a first bearing portion, a second bearing portion, and at least two ribbed plates. An annular groove is defined between the first bearing portion and the second bearing portion. The at least two ribbed plates are formed in the annular groove. Each of the at least two ribbed plates includes a first ribbed portion and a second ribbed portion connected to the first ribbed portion. The first ribbed portion is connected to the second bearing portion; the second ribbed portion is connected to the first bearing portion. An included angle $\theta_1$ is defined by the first ribbed portion and the second ribbed portion, and $\theta_1$ is an obtuse angle. The disclosure also relates to a coating device.

9 Claims, 11 Drawing Sheets

COATING MASK AND COATING DEVICE

FIELD

The subject matter of the application generally relates to a coating mask and a coating device.

BACKGROUND

In order to solve imaging problems in a lens module, such as speckles caused by stray light, a black film is coated on the peripheral area of the lens by a coating device, the black film is ring-shaped. Since the coating device has a rib plate, the rib plate causes ribbed marks on the black film, and the ribbed marks may cause the black film on the lens to be incomplete, thereby failing to completely solve the imaging problems.

Therefore, there is room for improvement in the art.

BRIEF DESCRIPTION OF THE DRAWINGS

Implementations of the present disclosure will now be described, by way of embodiments, with reference to the attached figures.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale, and the proportions of certain portions may be exaggerated to better illustrate details and features of the present disclosure.

The disclosure is illustrated by way of example and not by way of limitation in the figures of the accompanying drawings, in which like references indicate similar elements. It should be noted that references to "an" or "one" embodiment in this disclosure are not necessarily to the same embodiment, and such references mean "at least one."

The term "comprising" when utilized, means "including, but not necessarily limited to"; it specifically indicates open-ended inclusion or membership in the so-described combination, group, series, and the like.

FIGS. 1-7 show a first embodiment of a coating device 100. The coating device 100 can form a coating film (not shown) on a designated area of a to-be-plated component 200. In at least one embodiment, the coating film 210 is annular, and the to-be-plated component 200 is a lens.

Figure 1:
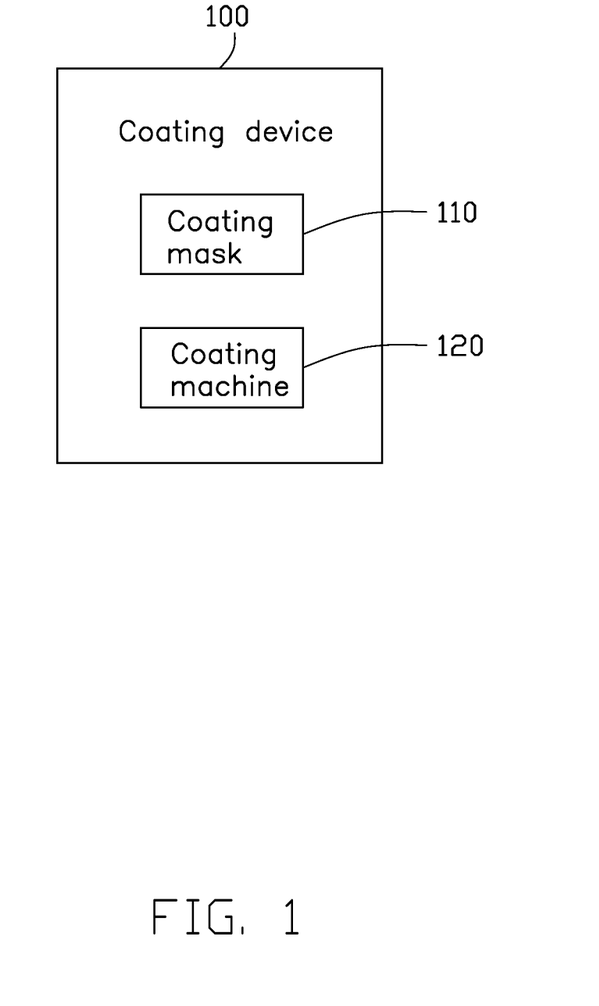
FIG. 1 is a block view of a first embodiment of a coating device according to the present disclosure.

Referring to FIG. 1, the coating device 100 includes a coating mask 110 and a coating machine 120. The coating machine 120 is located on one side of the coating mask 110. The to-be-plated component 200 is received and fixed in the coating mask 110.

Figure 2:
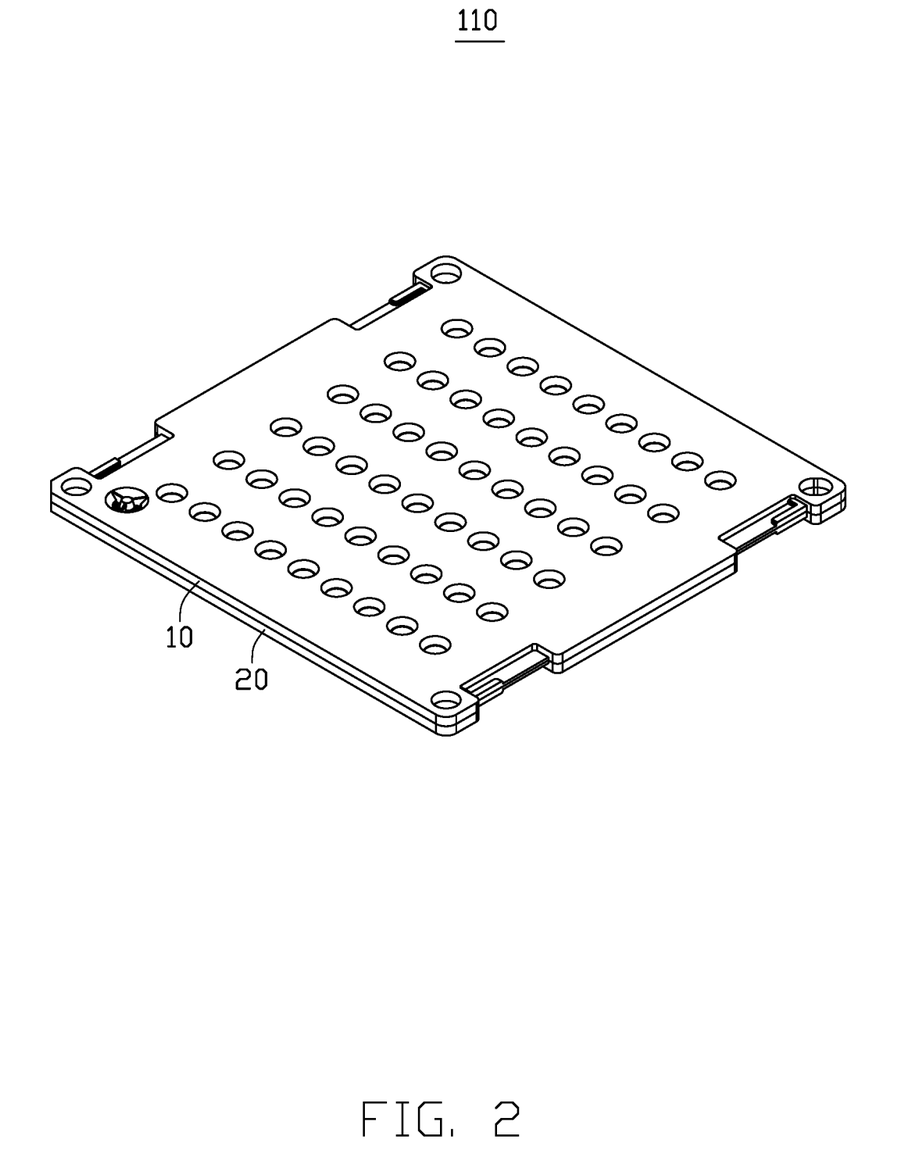
FIG. 2 is a perspective view of a coating mask of the coating device of FIG. 1.
Figure 3:
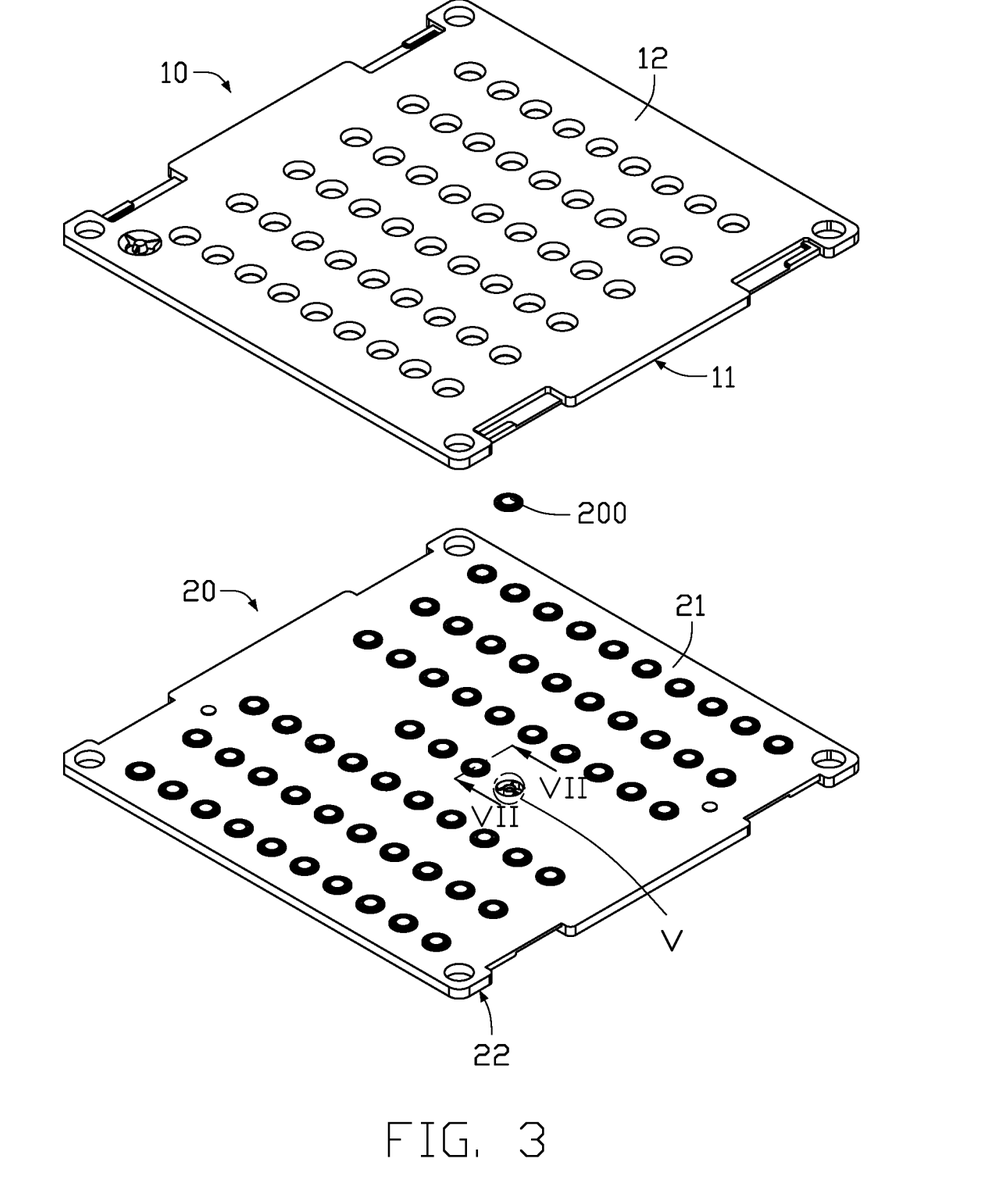
FIG. 3 is an exploded view of the coating mask of FIG. 2.
Figure 4:
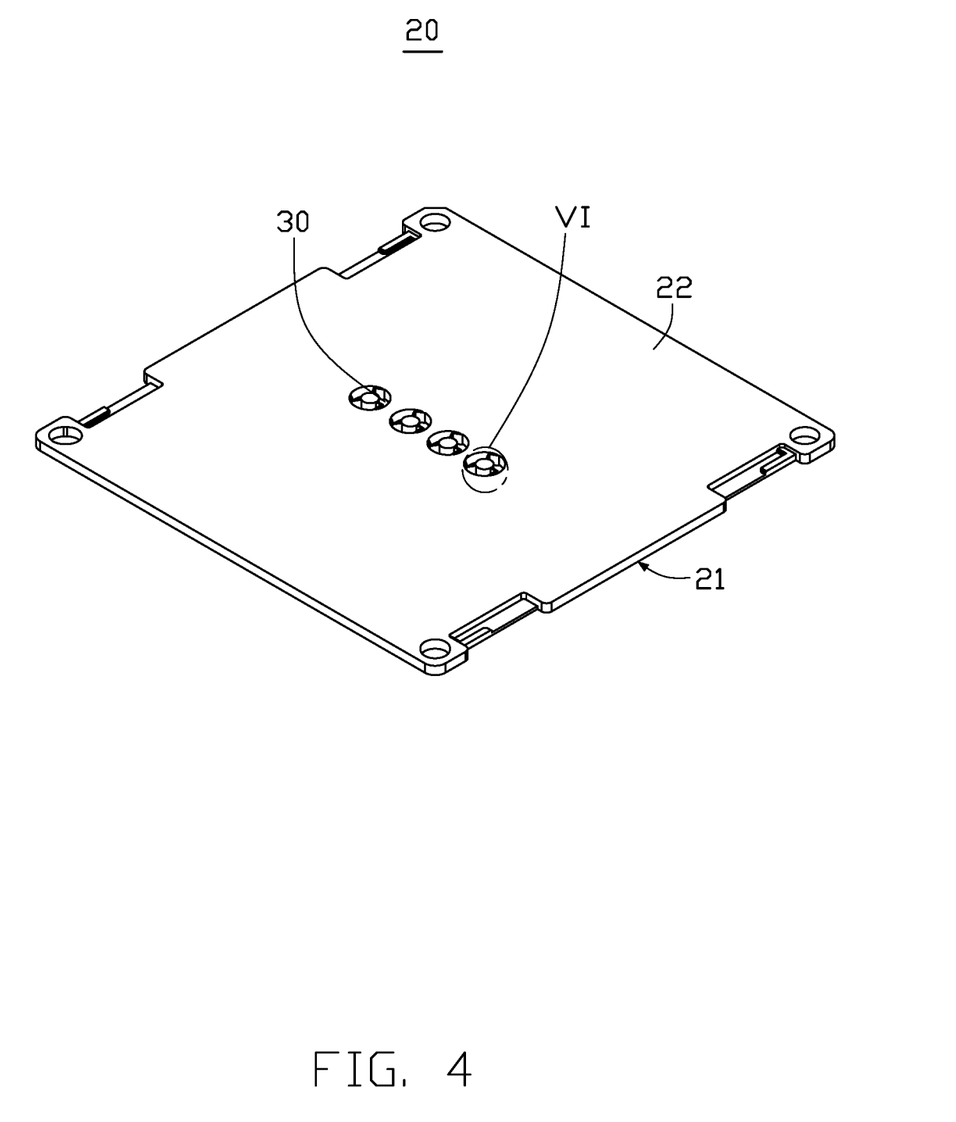
FIG. 4 is a perspective view of a bearing plate and a bearing unit of the coating mask of FIG. 3.
Figure 7:
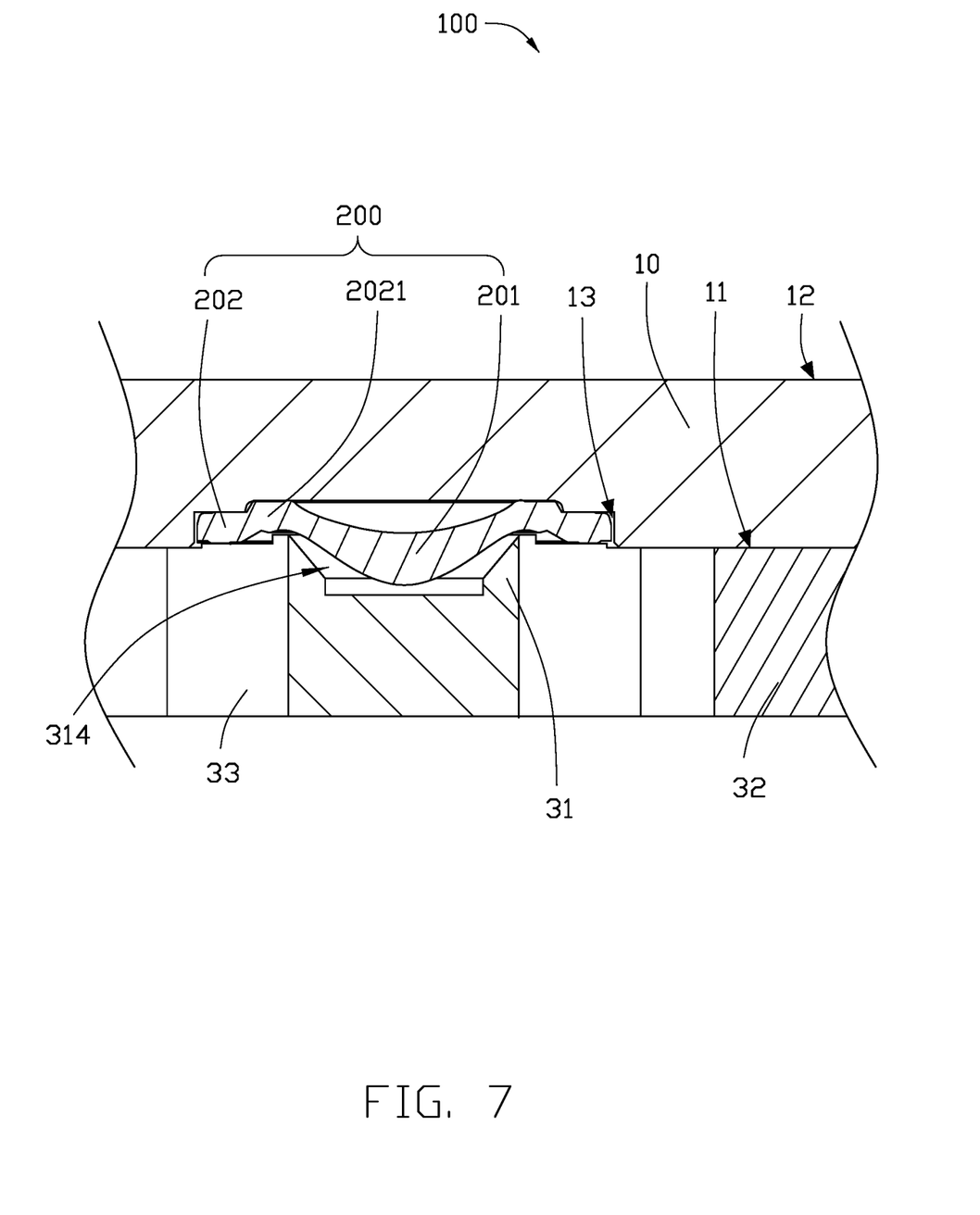
FIG. 7 is a cross-section view along a line VII-VII of FIG. 3.

Referring to FIGS. 2-3 and 7, the coating mask 110 includes a cover plate 10, a bearing plate 20, and at least one bearing unit 30. The cover plate 10 is fixed on the bearing plate 20. The at least one bearing unit 30 is defined in the bearing plate 20 in an array.

Referring to FIGS. 3 and 7, the cover plate 10 includes a first surface 11 and a second surface 12 opposite to the first surface 11. At least one first receiving groove 13 is defined in the cover plate 10 from the first surface 11 to the second surface 12. The first receiving groove 13 receives the to-be-plated component 200.

Referring to FIG. 3, the bearing plate 20 includes a third surface 21 and a fourth surface 22 opposite to the third surface 21.

Figure 5:
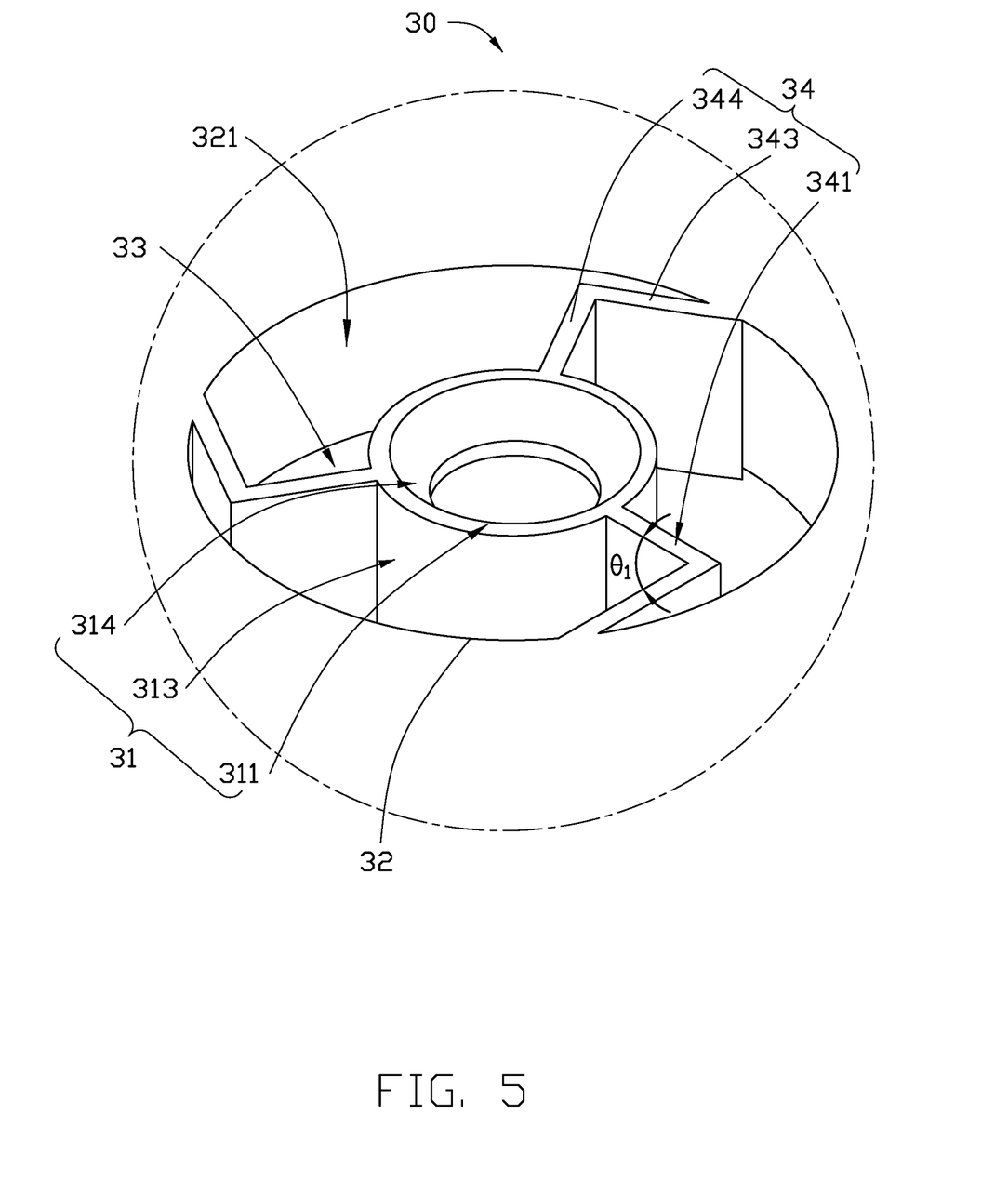
FIG. 5 is an enlarged view of a bearing unit V of FIG. 3.
Figure 6:
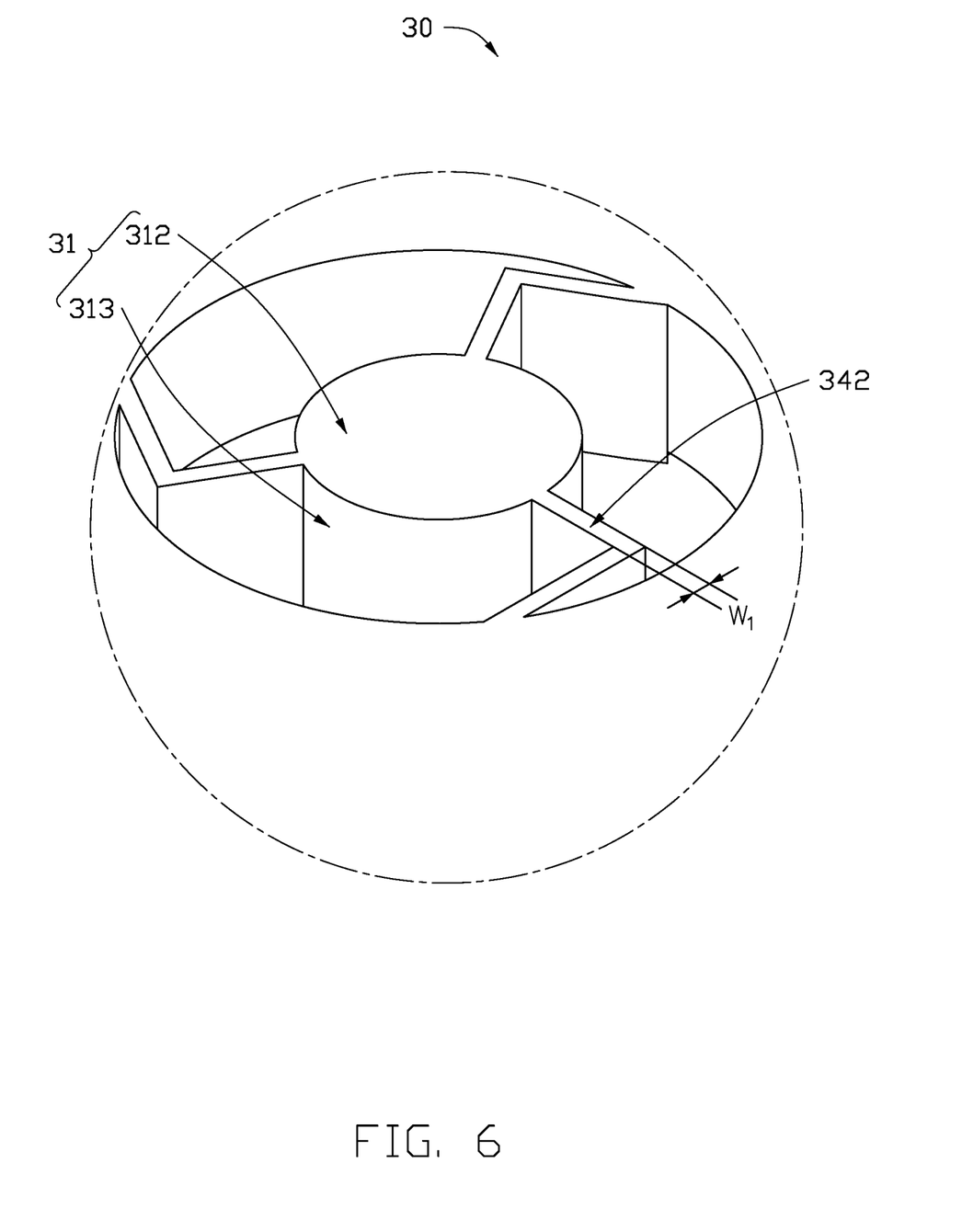
FIG. 6 is an enlarged view of a bearing unit VI of FIG. 4.

Referring to FIGS. 5-6, each bearing unit 30 includes a first bearing portion 31, a second bearing portion 32, and at least two ribbed plates 34. An annular groove 33 is defined between the first bearing portion 31 and the second bearing portion 32. The ribbed plates 34 are formed in the annular groove 33 and connected to the first bearing portion 31 and the second bearing portion 32.

The first bearing portion 31 includes a fifth surface 311, a sixth surface 312, and an outer surface 313. The sixth surface 312 is opposite to the fifth surface 311. The outer surface 313 is connected to the fifth surface 311 and the sixth surface 312. The annular groove 33 is defined in the first bearing portion 31 from the fifth surface 311 to the sixth surface 312. The annular groove 33 penetrates the fifth surface 311 and the sixth surface 312.

A second receiving groove 314 is defined in the first bearing portion 31 from the fifth surface 311 to the sixth surface 312. The second receiving groove 314 penetrates the fifth surface 311 but does not penetrate the sixth surface 312.

The second bearing portion 32 includes an inner surface 321. One end of each ribbed plate 34 is fixed on the inner surface 321, the opposite end of each ribbed plate 34 is fixed on the outer surface 313.

Each ribbed plate 34 includes a seventh surface 341 and an eighth surface 342 opposite to the seventh surface 341. The seventh surface 341 is flush with the fifth surface 311. The eighth surface 342 is flush with the sixth surface 312.

In at least one embodiment, each ribbed plate 34 further includes a first ribbed portion 343 and a second ribbed portion 344 connected to the first ribbed portion 343. In at least one embodiment, the first ribbed portion 343 is connected to the inner surface 321 of the second bearing portion 32, and the second ribbed portion 344 is connected to the outer surface 313 of the first bearing portion 31.

An included angle $\theta_1$ is defined by the first ribbed portion 343 and the second ribbed portion 344, and $\theta_1$ is an obtuse angle. In at least one embodiment, $90° \le \theta_1 \le 150°$.

In at least one embodiment, the first ribbed portion 343 has a width that is equal to the second ribbed portion 344. $W_1$ is the thickness of the first ribbed portion 343 and the second ribbed portion 344, 0.05 mm<$W_1$≤0.2 mm. Preferably, 0.05 mm<$W_1$<0.2 mm. In at least one embodiment, $W_1$=0.1 mm.

Referring to FIG. 7, the to-be-plated component 200 includes a convex portion 201 and an edge portion 202 surrounding and connected to the convex portion 201. The convex portion 201 faces the first bearing portion 31. The edge portion 202 is formed on the second bearing portion 32. A coating area 2021 is defined on the edge portion 202. The coating area 2021 faces the annular groove 33. The convex portion 201 is received in the second receiving groove 314. The coating film 210 is formed on the coating area 2021. The coating film 210 is an antireflection film. In at least one embodiment, the coating film 210 is a black film.

Figure 8:
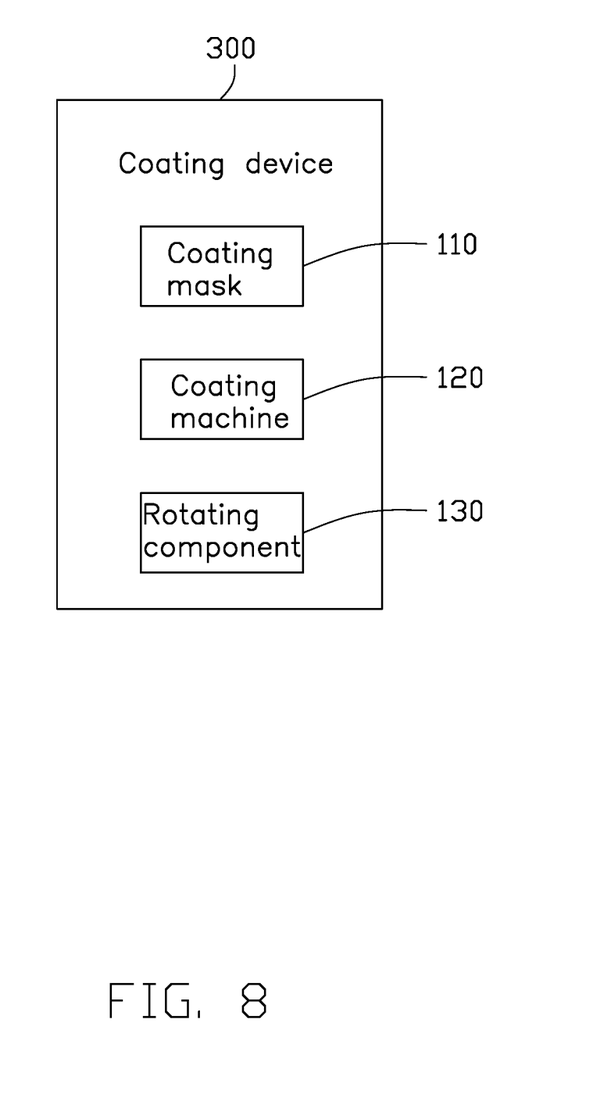
FIG. 8 is a module view of a second embodiment of a coating device according to the present disclosure.
Figure 9:
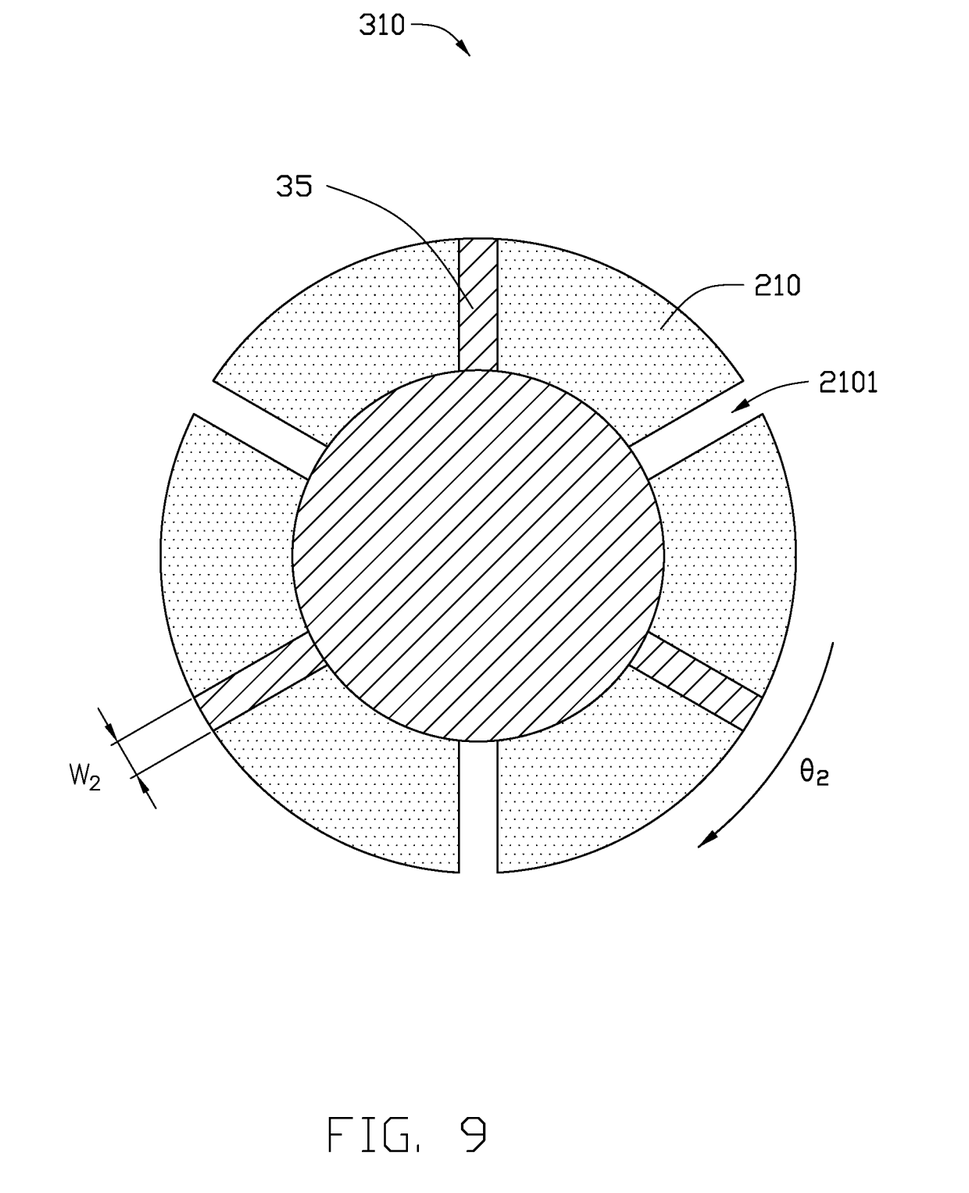
FIG. 9 is a top view of a bearing unit of the coating device of FIG. 8.

FIGS. 8 and 9 show a second embodiment of a coating device 310. The coating device 310 has a structure that is basically the same as the coating device 100. The distinction between the coating device 310 and the coating device 100 is that the coating device 310 further includes a rotating component 130. A plurality of ribbed areas 2101 is formed on the coating area 2021 that is covered by ribbed plates 35. The rotating component 130 is electrically connected to the coating mask 110 and can rotate the coating mask 110 to a point where the ribbed areas 2101 are exposed from the annular groove 33.

In at least one embodiment, the rotating component 130 is a motor. In other embodiments, the rotating component 130 may be other components.

$\theta_2$ is the rotating angle of the coating mask 110 driven by the rotating component 130. In at least one embodiment, $\theta_2$=180°.

$W_2$ is the thickness of the ribbed plate 35, and 0.05 mm<$W_2$≤0.2 mm. In at least one embodiment, the $W_2$=0.2 mm.

The ribbed plate 35 may have the same structure as the ribbed plate 34 or may be unbent. In at least one embodiment, the ribbed plate 35 is unbent.

When the coating device 310 is used to form a coating film 210 on the to-be-plated component 200, firstly, the to-be-plated component 200 is placed on the bearing plate 20 and then the cover plate 10 is covered on the bearing plate 20. Secondly, the coating machine 120 performs a first coating on the coating area 2021 exposed from the annular groove 33. And thirdly, the rotating component 130 starts to rotate the coating mask 110 to expose the ribbed areas 2101. Fourthly and finally, the coating machine 120 performs a second coating on the ribbed areas 2101 exposed from the annular groove 33.

Figure 10:
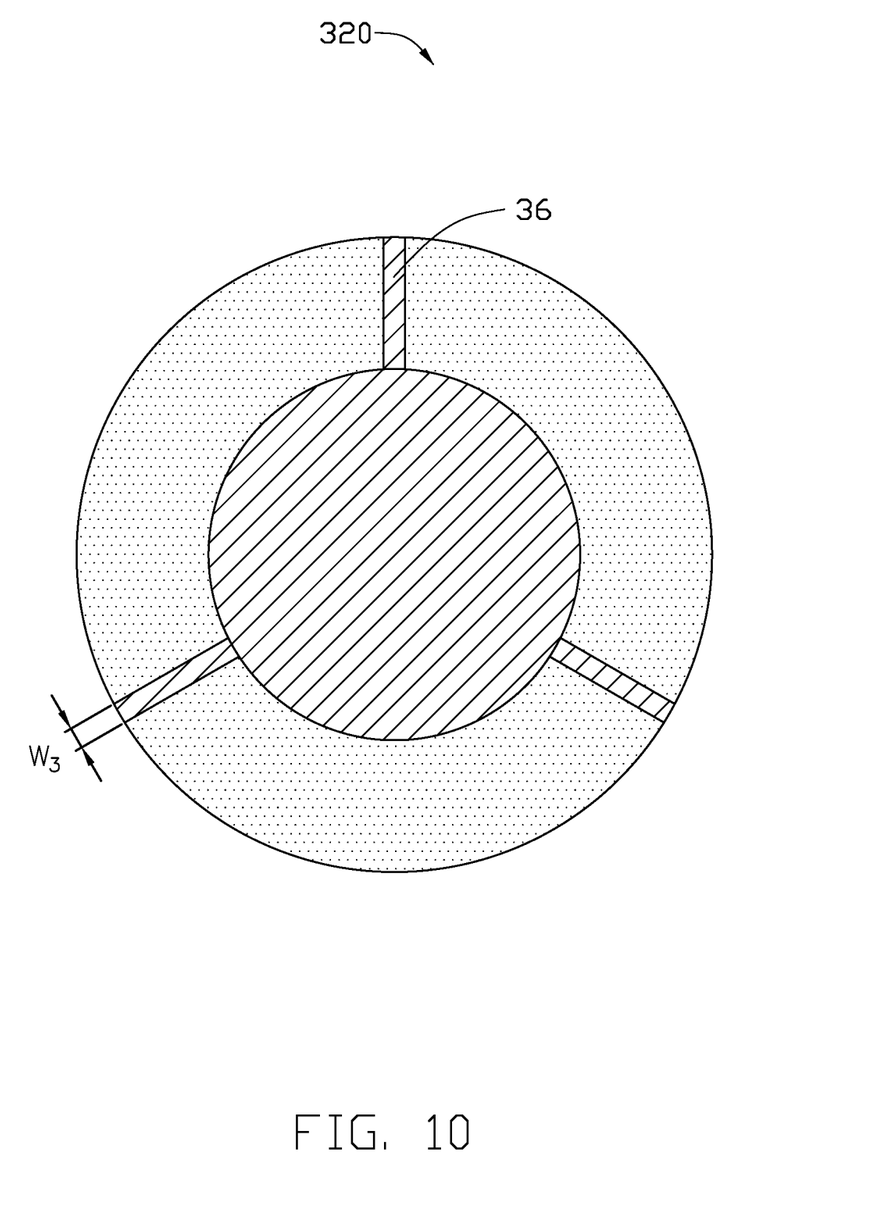
FIG. 10 is a top view of a third embodiment of a bearing unit according to the present disclosure.

FIG. 10 shows a bearing unit 320. The bearing unit 320 has a structure that is basically the same as the bearing unit 30. The distinction between the bearing unit 320 and the bearing unit 30 is that ribbed plates 36 of the bearing unit 320 have a thickness $W_3$ that is less than the ribbed plates 34, 0.05 mm<$W_3$<0.2 mm. In at least one embodiment, $W_3$=0.1 mm. In at least one embodiment, the ribbed plates 36 are unbent. In other embodiments, the ribbed plates 36 may be bent like the ribbed plates 34.

Figure 11:
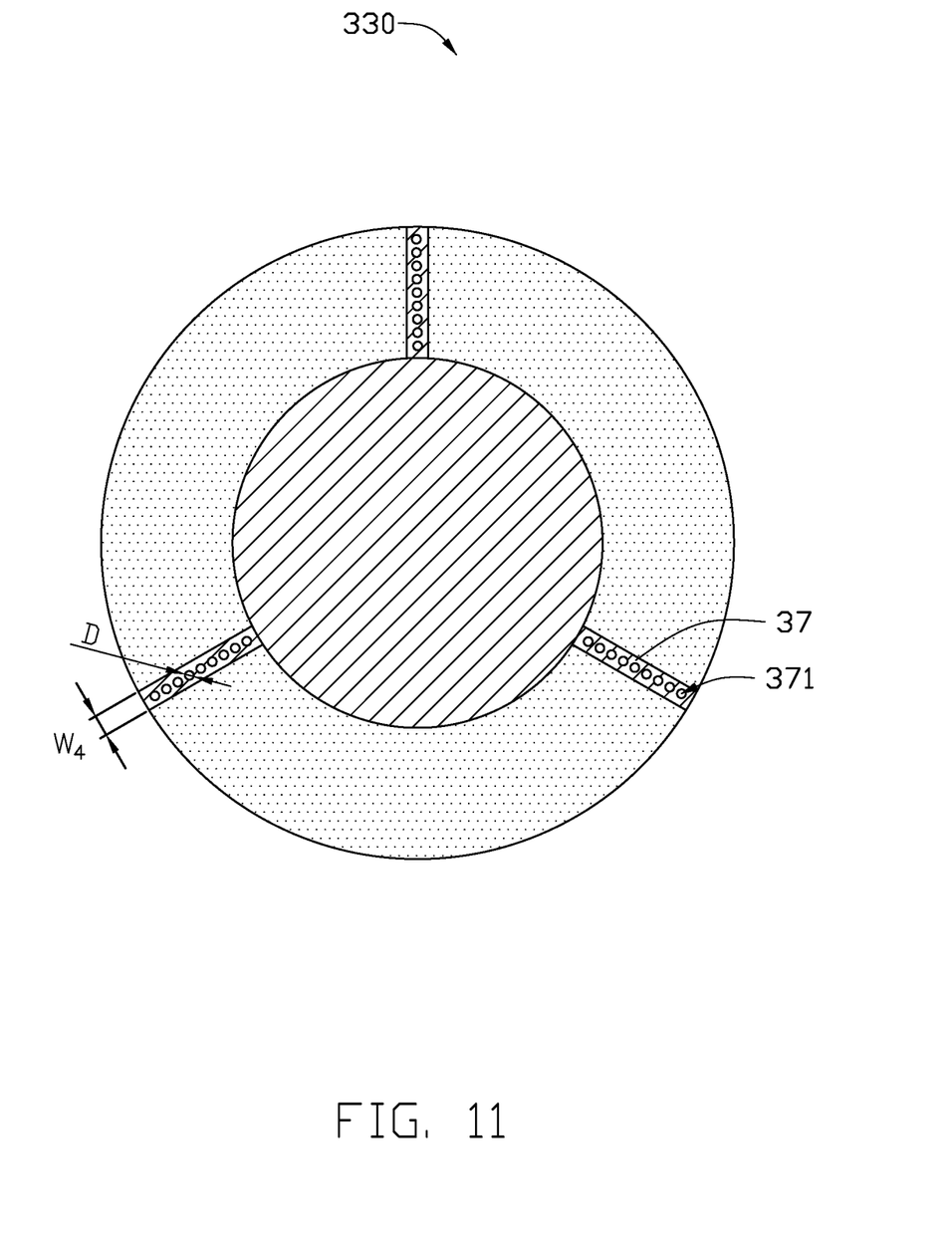
FIG. 11 is a top view of a fourth embodiment of a bearing unit according to the present disclosure.

FIG. 11 shows a bearing unit 330. The bearing unit 330 has a structure that is basically the same as the bearing unit 30. The distinction between the bearing unit 330 and the bearing unit 30 is that a plurality of through holes 371 are defined in ribbed plates 37 of the bearing unit 330. A portion of the to-be-plated component 200 covered by the ribbed plates 37 is exposed from the through holes 371. $W_4$ is the thickness of the ribbed plates 37, and D is the diameter of the through holes 371, 0.5$W_4$≤D≤0.8$W_4$. Preferably, 0.05 mm<$W_4$<0.2 mm. In at least one embodiment, $W_4$=0.1 mm. The ribbed plates 37 have a structure that are the same as the ribbed plates 34.

Preferably, 0.05 mm<$W_4$<0.2 mm. In at least one embodiment, $W_4$=0.1 mm. The ribbed plates 37 have a structure that are the same as the ribbed plates 34.

With the embodiments described above, the first ribbed portion and the second ribbed portion are bent, this reduces the ribbed areas, thereby presenting the coating film with a small ribbed area. Reducing the width of the ribbed plate reduces the total overall area of the ribbed areas. The through holes on the ribbed plate reduce the total overall area of the ribbed areas, thereby presenting the coating film with a small ribbed area. In this disclosure, the rotating component 130 performs a second coating on the ribbed areas exposed from the annular groove, so that a coating film free of rib marks can be obtained The embodiments shown and described above are only examples. Many details are often found in the art such as the other features of coating mask and coating device. Therefore, many such details are neither shown nor described. Even though numerous characteristics and advantages of the present disclosure have been positioned forth in the foregoing description, together with details of the structure and function of the present disclosure, the disclosure is illustrative only, and changes can be made in the detail, including in matters of shape, size, and arrangement of the parts within the principles of the present disclosure, up to and including the full extent established by the broad general meaning of the terms used in the claims. It will therefore be appreciated that the embodiments described above can be modified within the scope of the claims.

What is claimed is:

1. A coating mask for bearing and covering a portion of a to-be-plated component, the coating mask comprising:
at least one bearing unit, wherein each of the at least one bearing unit comprises:
a first bearing portion;
a second bearing portion; and
at least two ribbed plates; an annular groove is defined between the first bearing portion and the second bearing portion; the at least two ribbed plates are formed in the annular groove; each of the at least two ribbed plates comprises a first ribbed portion and a second ribbed portion connected to the first ribbed portion; the first ribbed portion is connected to the second bearing portion; the second ribbed portion is connected to the first bearing portion; and an included angle $\theta_1$ is defined by the first ribbed portion and the second ribbed portion, and the included angle $\theta_1$ is an obtuse angle.

2. The coating mask of claim 1, wherein $W_1$ is a thickness of each of the at least two ribbed plates, 0.05<$W_1$≤0.2.

3. The coating mask of claim 2, wherein 90°≤$\theta_1$≤150°.

4. The coating mask of claim 2, wherein a plurality of through holes is defined in the at least two ribbed plates; and a portion of the to-be-plated component covered by the at least two ribbed plates is exposed from the plurality of through holes.

5. The coating mask of claim 4, wherein D is a diameter of each of the plurality of through holes, 0.5$W_1$≤D≤0.8$W_1$.

6. The coating mask of claim 1, further comprising a bearing plate, wherein the at least one bearing unit is defined in the bearing plate in an array.

7. The coating mask of claim 6, wherein the to-be-plated component comprises a convex portion and an edge portion surrounding and connected to the convex portion, the convex portion faces the first bearing portion, the edge portion is formed on the second bearing portion, a coating area is defined on the edge portion, the coating area faces the annular groove, and a coating film is formed on the coating area.

8. The coating mask of claim 7, wherein the first bearing portion further comprises a first receiving groove, and the convex portion is received in the first receiving groove.

9. The coating mask of claim 1, further comprising a cover plate formed on the bearing plate, at least one second receiving groove is defined in the cover plate, and a portion of the to-be-plated component is received in the second receiving groove.

\* \* \* \* \*